US008630235B2

(12) United States Patent
Bamberger et al.

(10) Patent No.: US 8,630,235 B2
(45) Date of Patent: Jan. 14, 2014

(54) METHOD AND APPARATUS FOR THE COMPUTER-AIDED CLASSIFICATION OF MEASUREMENTS FOR THE FEATURE-BASED POSITIONING OF A MOBILE OBJECT IN A PREDETERMINED REGION

(75) Inventors: Joachim Bamberger, Krailling (DE); Marian Grigoras, Neubiberg (DE); Martin Kunz, Nürnberg (DE); Andrei Szabo, Ottobrunn (DE)

(73) Assignee: Siemens Aktiengesellschaft, Munich (DE)

( * ) Notice: Subject to any disclaimer, the term of this patent is extended or adjusted under 35 U.S.C. 154(b) by 289 days.

(21) Appl. No.: 13/060,463

(22) PCT Filed: Jul. 20, 2009

(86) PCT No.: PCT/EP2009/059282
§ 371 (c)(1),
(2), (4) Date: Feb. 24, 2011

(87) PCT Pub. No.: WO2010/028895
PCT Pub. Date: Mar. 18, 2010

(65) Prior Publication Data
US 2011/0164569 A1 Jul. 7, 2011

(30) Foreign Application Priority Data

Sep. 12, 2008 (EP) ..................................... 08016155
Apr. 3, 2009 (DE) ......................... 10 2009 016 230

(51) Int. Cl.
*H04L 5/12* (2006.01)
(52) U.S. Cl.
USPC ............................ 370/328; 370/469; 455/456
(58) Field of Classification Search
USPC .......... 370/328–339, 469; 455/456, 433–439; 340/539
See application file for complete search history.

(56) References Cited

U.S. PATENT DOCUMENTS 7,170,406 B2* 1/2007 Seemann .................. 340/539.11
7,675,410 B2* 3/2010 Aritsuka et al. ........... 340/539.1
(Continued)

FOREIGN PATENT DOCUMENTS

| DE | 102006044293 A1 | 10/2007 | ............... G01S 5/02 |
| DE | 102008038451 A1 | 11/2009 | ............... G01S 5/14 |
| WO | 2007/118518 A1 | 10/2007 | ............... H04Q 7/38 |

OTHER PUBLICATIONS

International PCT Search Report, PCT/EP2009/059282, 15 pages, Jan. 13, 2010.

(Continued)

*Primary Examiner* — Ricky Ngo
*Assistant Examiner* — Iqbal Zaidi
(74) *Attorney, Agent, or Firm* — King & Spalding L.L.P.

(57) ABSTRACT

In a method for the computer-aided classification of measurements for the featured-based positioning of a mobile object in a predetermined region, for which one or more starting regions are defined through which the mobile object can leave and enter the predetermined region, each measurement is specified by a time and features of several base stations. The measurements are classified based on the relative base stations positions and the base station features, wherein a respective first class measurement is categorized as a measurement in a mobile object position inside the predetermined region and a respective second class measurement is categorized as a potential measurement in a mobile object position outside of the predetermined region. Subsequently, for a respective second class measurement, the path of the mobile object is tracked to determine whether the respective measurement is located inside the predetermined region to be also assigned to the first class.

27 Claims, 4 Drawing Sheets

(56) References Cited

U.S. PATENT DOCUMENTS

2009/0023461 A1* 1/2009 Filizola et al. ............. 455/456.3
2010/0103048 A1 4/2010 Bamberger et al. ........... 342/451

OTHER PUBLICATIONS

Wang, H. et al., "WLAN-Based Pedestrian Tracking Using Particle Filters and Low-Cost MEMS Sensors", $4^{th}$ Workshop on Positioning, Navigation and Communication, 7 pages, Mar. 1, 2007.

Wang, H. et al., "Enhancing the Map Usage for Indoor Location-Aware Systems", Lecture Notes in Computer Science, Human-Computer Interaction, Interaction Platforms and Techniques, Aug. 23, 2007.

Chai, X, et al., "Reducing the Calibration Effort for Location Estimation Using Unlabeled Samples", Proceedings of the $3^{rd}$ IEEE Int'l Conference on Pervasive Computing and Communications, 10 pages, Mar. 21, 2005.

* cited by examiner

METHOD AND APPARATUS FOR THE COMPUTER-AIDED CLASSIFICATION OF MEASUREMENTS FOR THE FEATURE-BASED POSITIONING OF A MOBILE OBJECT IN A PREDETERMINED REGION

CROSS-REFERENCE TO RELATED APPLICATIONS

This application is a U.S. National Stage Application of International Application No. PCT/EP2009/059282 filed Jul. 20, 2009, which designates the United States of America, and claims priority to EP Application No. 08016155.7 filed Sep. 12, 2008 and DE Application No. 10 2009 016 230.5 filed Apr. 3, 2009. The contents of which are hereby incorporated by reference in their entirety.

TECHNICAL FIELD

The invention relates to a method and an apparatus for the computer-aided classification of measurements for the feature-based positioning of a mobile object in a predetermined region.

BACKGROUND

Different feature-based positioning methods for mobile users or terminal devices in wireless communication networks are known from the prior art. In this situation, the field strengths of fields through the mobile object for example are measured as features, whereby the field is generated and emitted by a plurality of base stations in the communication network. DECT networks (DECT=Digital Enhanced Cordless Telecommunication), WLAN networks (WLAN=Wireless Local Area Network) and the GSM (GSM=Global System for Mobile Communication) and UMTS (UMTS=Universal Mobile Telecommunication System) mobile radio networks are for example employed as communication networks.

So-called reference maps in which a relationship between the spatial position of the node and feature-dependent variables of the individual base stations is stored for a plurality of nodes are frequently employed with regard to the feature-based positioning. Feature-dependent variables in a field strength based method for example are the field strength of the field emitted by a base station at the spatial position of the node or the field strength, measured at the base station, of a field which is emitted by an object which is situated at the spatial position of the node. As a result of measuring the field strength at any desired position and comparing the measured value with the field strength dependent variables at the nodes of the reference map it is possible to ascertain the position of the object.

Different methods for the feature-based positioning with the aid of reference maps are known from the prior art. In conventional methods, in this situation a calibration or initial measurement of reference patterns for producing the reference map is first performed in order to achieve a sufficient degree of accuracy in structured environments. The positioning is then performed on the basis of the reference map ascertained in this manner.

Positioning methods are moreover known wherein an initial calibration of the reference map is dispensed with. Such a positioning method is described in the publication DE 10 2006 044 293 A1. In this method, parallel to the positioning the nodes of a reference map are also simultaneously learned stepwise on the basis of the measured features of the field.

In this situation, the method commences with a coarse initialization of the reference map which for example is based on a linear radial model of the radiation propagation of the base stations.

In order to avoid any error propagation in the methods described above for the positioning of an object or for learning a reference map, it is necessary to ensure with regard to the positioning or the learning of the reference map that the object is moving only in a predetermined region provided for the positioning. This serves to avoid measurements which are situated outside the predetermined region being assigned to this region and thus resulting in a corruption of the positioning or of the learned reference map. There is however also a need to enable a positioning or a learning of a reference map for an object moving randomly in the area surrounding the predetermined region, such that it is not necessary to ensure that the object is also always situated in the predetermined region. In such a case a suitable method must be created which makes it possible to determine whether the object is situated inside or outside the region of the reference map.

SUMMARY

According to various embodiments, a method and an apparatus for the computer-aided classification of measurements for the feature-based positioning of a mobile object can be created which makes it possible to determine automatically whether the mobile object is situated in a predetermined region during a respective measurement.

According to an embodiment, a method for the computer-aided classification of measurements for the feature-based positioning of a mobile object in a predetermined region, for which one or more exit areas are defined, by means of which the mobile object can leave and enter the predetermined region, whereby each measurement is specified by a measuring time and measured features of a plurality of base stations, whereby one feature of a base station characterizes a field emitted by the base station at the object or a field emitted by the object at the base station, may comprise: —the measurements are classified on the basis of the positions of the base stations with respect to the predetermined region and the features of the base stations measured during the respective measurements, whereby a respective measurement of a first class is categorized as a measurement in a position of the mobile object inside the predetermined region and a respective measurement of a second class is categorized as a potential measurement in a position of the mobile object outside the predetermined region; —for a respective measurement of the second class a number of successive measurements before and/or after the measuring time of the respective measurement up until the occurrence of a measurement of the first class is analyzed as to whether the mobile object has left or entered the predetermined region by way of an exit area during the course of the number of measurements, whereby in the event that the mobile object has not left or entered the predetermined region the respective measurement is assigned to the first class.

According to a further embodiment, measurements of a third class can be additionally taken into consideration with regard to classification, whereby a measurement of the third class is categorized as a measurement in a position of the mobile object outside the predetermined region. According to a further embodiment, in the event that the analysis of the number of successive measurements before and/or after the measuring time of the respective measurement up until the occurrence of a measurement of the first class shows that the mobile object has left or entered the predetermined region, at least the respective measurement can be assigned to the third class, whereby in particular all the measurements of the number of successive measurements having measuring times prior to entry to or after exit from the predetermined region are assigned to the third class and the remaining measurements of the number of successive measurements are assigned to the first class. According to a further embodiment, a respective measurement can be assigned to the first class when the feature of at least one base station of a first type satisfies a predetermined criterion, whereby base stations of the first type are located inside the predetermined region and the predetermined criterion is designed in such a manner that when the criterion is satisfied it is possible to conclude that the mobile object is located inside the predetermined region. According to a further embodiment, a respective measurement can be assigned to the second class in the situation when the respective measurement cannot be assigned to any other class and/or when one or more predetermined conditions are satisfied. According to a further embodiment, a respective measurement can be assigned to the third class in the situation when the feature of at least one base station of a second type satisfies a predetermined criterion, whereby the base stations of the second type are located outside the predetermined region and the predetermined criterion is designed in such a manner that when the criterion is satisfied it is possible to conclude that the mobile object is located outside the predetermined region. According to a further embodiment, in the case that no measurement of the first class is found for the analysis of the number of successive measurements before and/or after the measuring time of the respective measurement, the respective measurement may remain in the second class. According to a further embodiment, for a respective measurement of the first class all the measurements within a period of time before and/or after the measuring time assigned to the respective measurement can be assigned to the first class, whereby the period of time is given by the time interval during which the mobile object, on the basis of its position at the measuring time of the respective measurement and based on a predetermined maximum speed of the mobile object, is unable to move out of the predetermined region. According to a further embodiment, for the respective measurement of the first class the position of the mobile object at the measuring time of the respective measurement can be estimated as the position of the base station of the first type, the feature of which satisfies the predetermined criterion. According to a further embodiment, for a respective measurement of the third class all the measurements within a period of time before and/or after the measuring time assigned to the respective measurement can be assigned to the third class, whereby the period of time is given by the time interval during which the mobile object, on the basis of its position at the measuring time of the respective measurement and based on a predetermined maximum speed of the mobile object, is unable to move into the predetermined region.

According to a further embodiment, for the respective measurement of the third class the position of the mobile object at the measuring time of the respective measurement can be estimated as the position of the base station of the second type, the feature of which satisfies the predetermined criterion. According to a further embodiment, with regard to the analysis of the number of successive measurements before and/or after the measuring time of the respective measurement the positions of the mobile object can be estimated on the basis of the measured features of the base stations at the measuring times of the number of measurements using a positioning method and/or a movement model of the mobile object and from this is ascertained whether the mobile object has entered or left the predetermined region by way of an exit area. According to a further embodiment, the positioning method can be a pattern-based positioning method, wherein the position of the mobile object is ascertained on the basis of the correspondence of the measured features of the base stations with the features of nodes in a reference map, whereby predetermined nodes in the reference map are preferably assigned to the exit area or exit areas of the predetermined region and the predetermined nodes are used to determine whether the mobile object has entered or left the predetermined region by way of an exit area. According to a further embodiment, the positioning method can be based on triangulation of the features of the base stations. According to a further embodiment, the features of the base stations can be the signal strengths and/or the propagation delays and/or the angular distributions at the object of the field emitted by the base stations or at the base stations of the field emitted by the object. According to a further embodiment, a respective measurement can be assigned to the first class if the signal strength of at least one base station of a first type exceeds a predetermined value. According to a further embodiment, a respective measurement can be assigned to the third class if the signal strength of at least one base station of the second type exceeds a predetermined value. According to a further embodiment, a respective measurement can be assigned to the second class when at least one of the following conditions is satisfied: —the signal strengths of all the base stations inside the predetermined region lie below a predetermined value; —the signal strengths of predetermined base stations outside the predetermined region lie above a predetermined value. According to a further embodiment, a respective measurement can be assigned to the second class when at least the condition is satisfied that there is no adequate correspondence between the features of the base stations of the respective measurement and the features of at least one node in the reference map. According to a further embodiment, measurements from a plurality of predetermined regions can be classified using the method, whereby the predetermined regions are preferably located in different floors of a building and exit areas of the predetermined regions are specified, by way of which a mobile object is able to change floors. According to a further embodiment, the method can be carried out after the measurements have been performed. According to a further embodiment, the method can be carried out while are measurements are being performed, whereby the measurements are buffered at a predetermined time interval.

According to yet another embodiments, an apparatus for the computer-aided classification of measurements for the feature-based positioning of a mobile object in a predetermined region, can be designed in such a manner that a method as described above can be carried out using the apparatus.

According to another embodiment, in another method for the feature-based positioning of a mobile object in a predetermined region, for which one or more exit areas are defined, by means of which the mobile object can leave and enter the predetermined region, each measurement xcan be specified by a measuring time and measured features of a plurality of base stations, whereby one feature of a base station characterizes a field emitted by the base station at the object or a field emitted by the object at the base station, whereby the measurements are classified on the basis of a method as described above and exclusively measurements of the first class are taken into consideration with regard to the positioning.

According to yet another embodiment, an apparatus for the feature-based positioning of a mobile object in a predetermined region, can be designed in such a manner that the another method as described above can be carried out using the apparatus.

According to yet another embodiment, a computer program product may have program code stored on a machine-readable medium for carrying out a method as described above when the program runs on a computer.

BRIEF DESCRIPTION OF THE DRAWINGS

Exemplary embodiments will be described in detail in the following with reference to the attached figures.

In the drawings.

DETAILED DESCRIPTION

The method according to various embodiments is used for the computer-aided classification of measurements in a predetermined region, for which one or more exit areas are defined, by way of which the mobile object can leave and enter the predetermined region, whereby each measurement is specified by a measuring time and measured features of a plurality of base stations, whereby a feature of a base station characterizes a field emitted by the base station at the object or a field emitted by the object at the base station. The features are for example corresponding signal strengths of the emitted fields. The features may however if applicable also relate to the propagation delay of the signals or the angular distributions of the signals.

According to various embodiments, the measurements are classified on the basis of the positions of the base stations with respect to the predetermined region and the features of the base stations measured during the respective measurements, whereby a classification at least into a first and a second class follows. In this situation, a respective measurement of the first class is categorized as a measurement in a position of the mobile object inside the predetermined region and a respective measurement of a second class is categorized as a potential measurement in a position of the mobile object outside the predetermined region. The measurements of the first class are thus measurements for which it can be reliably assumed on the basis of the measured features that these measurements relate to positions of the mobile object inside the predetermined region. This is not the case for measurements of the second class, which means that these measurements are categorized as potential measurements outside the predetermined region. With regard to the described classification, no positioning is preferably actually performed, but corresponding criteria are defined on the basis of the known positions of the base stations and the measured features, according to which criteria it is possible to determine whether a mobile object can be assigned to a position inside the predetermined region.

In order to nevertheless specify a measurement of a second class if applicable so that it is located inside the predetermined region, according to various embodiments the movement path of the mobile object is tracked in the area surrounding such a measurement. In particular, for a respective measurement of the second class a number of successive measurements before and/or after the measuring time of the respective measurement up until the occurrence of a measurement of the first class is analyzed as to whether the mobile object has left or entered the predetermined region by way of an exit area during the course of the number of measurements, whereby in the event that the mobile object has not left or entered the predetermined region the respective measurement is assigned to the first class.

The method according to various embodiments is characterized by the fact that information about exit areas of the predetermined region is taken into consideration in the method, whereby on the basis of this information many of the measurements can be classified as to whether they are located inside the predetermined region. The method according to various embodiments can in particular be used as a preprocessing step for performing the actual positioning or the learning of reference maps, whereby the feature-based positioning methods mentioned in the introduction can be used for the actual positioning or for the learning of the reference maps. In particular, in this situation the predetermined region is the region which is covered by the reference map to be learned. With regard to the positioning or to the learning of the reference map, in this situation only those measurements are taken into consideration which are assigned to the first class and are thus unequivocally located inside the predetermined region.

In an embodiment of the method, measurements of a third class are additionally taken into consideration with regard to classification, whereby a measurement of the third class is categorized as a measurement in a position of the mobile object outside the predetermined region. In this situation, by way of the measured features of the base stations the measurements of the third class enable a reliable statement of the fact that the position of the mobile object during the measurement is located outside the predetermined region. The measurements of this class are then also no longer taken into consideration during a corresponding feature-based positioning.

In a further embodiment of the method, in the event that the analysis of the number of successive measurements before and/or after the measuring time of the respective measurement up until the occurrence of a measurement of the first class shows that the mobile object has left or entered the predetermined region, at least the respective measurement is assigned to the third class. By preference in this situation, all the measurements of the number of successive measurements having measuring times prior to entry to or after exit from the predetermined region are assigned to the third class and the remaining measurements of the number of successive measurements are assigned to the first class. In this manner, a multiplicity of measurements can be classified while taking into consideration correspondingly defined exit areas.

In a further embodiment of the method, a respective measurement is assigned to the first class in the situation when the feature of at least one base station of a first type satisfies a predetermined criterion, whereby base stations of the first type are located inside the predetermined region and the predetermined criterion is designed in such a manner that when the criterion is satisfied it is possible to conclude that the mobile object is located inside the predetermined region. Through suitable definition of corresponding base stations, which in particular have large distances to marginal areas of the predetermined region, it is possible without performing a positioning to create a suitable criterion which allows the conclusion to be drawn that a mobile object is located inside the predetermined region. As described in more detail below, the criterion can for example be the exceeding of a predetermined threshold for the signal strength of the field of the base station of the first type.

In a further embodiment of the method, a respective measurement is assigned to the second class in the situation when the respective measurement cannot be assigned to any other class and/or when one or more predetermined conditions are satisfied.

In a further embodiment of the method, a respective measurement is assigned to the third class in the situation when the feature of at least one base station of a second type satisfies a predetermined criterion, whereby the base stations of the second type are located outside the predetermined region and the predetermined criterion is designed in such a manner that when the criterion is satisfied it is possible to conclude that the mobile object is located outside the predetermined region. Through suitable definition of base stations of the second type, which in particular are base stations which are located at a considerable distance from the predetermined region, it is thus possible to create a suitable criterion for the classification of a mobile object at a position outside the predetermined region. As described in more detail below, in this situation a measurement can in particular be assigned to a third class if the signal strength of the field of the base station of the second type exceeds a predetermined value.

In a further embodiment of the method, the case that no measurement of the first class is found for the analysis of the number of successive measurements before and/or after the measuring time of the respective measurement is taken into consideration in such a manner that the respective measuring point remains in the second class. A measuring point which cannot reliably be assigned to the first class is thus also not included in this class. By this means, the number of misclassifications which corrupt the positioning or the learning of a reference map is kept as small as possible.

In a further embodiment of the method, for a respective measurement of the first class all the measurements within a period of time before and/or after the measuring time assigned to the respective measurement are assigned to the first class, whereby the period of time is given by the time interval during which the mobile object, on the basis of its position at the measuring time of the respective measurement and based on a predetermined maximum speed of the mobile object, is unable to move out of the predetermined region. In this manner, further measurements can be assigned to the first class in a simple manner while taking into consideration a suitable movement model of the mobile object. If base stations of the first type are used for the classification of the measurements, for the respective measurement of the first class the position of the mobile object at the measuring time of the respective measurement is estimated as the position of the base station of the first type, the feature of which satisfies the predetermined criterion.

The movement model just described can also be employed in a suitable manner for measurements of the third class. In this situation, for a respective measurement of the third class all the measurements within a period of time before and/or after the measuring time assigned to the respective measurement are assigned to the third class, whereby the period of time is given by the time interval during which the mobile object, on the basis of its position at the measuring time of the respective measurement and based on a predetermined maximum speed of the mobile object, is unable to move into the predetermined region.

In the embodiment wherein a base station of the second type is employed for the classification of measurements of the third class, for the respective measurement of the third class the position of the mobile object at the measuring time of the respective measurement is estimated as the position of the base station of the second type, the feature of which satisfies the predetermined criterion.

In a further embodiment of the method, with regard to the analysis of the number of successive measurements before and/or after the measuring time of the respective measurement, the positions of the mobile object are estimated on the basis of the measured features of the base stations at the measuring times of the number of measurements using a positioning method and/or a movement model of the mobile object. On the basis of the estimated positions it is then possible to ascertain whether the mobile object has entered or left the predetermined region by way of an exit area. In this situation in particular a coarse positioning method is used which for example is based on a coarse initialization of a corresponding reference map. This initialization can take place using a corresponding wave propagation model of the individual base stations. By the same token, the coarse positioning can also be performed without a reference map, for example through triangulation of the features of the individual base stations. Furthermore, a movement model can be incorporated in the positioning, which has already been described above and takes into consideration the maximum speed of the mobile object. When a movement model is used, position estimation is used in particular to ascertain which measurements are reliably located inside the predetermined region based on an estimated position of the mobile object at the measuring time.

In an embodiment, a pattern-based method which is based on a corresponding reference map is employed as the positioning method for the analysis of the number of successive measurements, whereby the use of reference maps has already been described in detail above. In this situation, the positional determination of the mobile object is ascertained on the basis of the correspondence of the measured features of the base stations with the features of nodes in the reference map. By preference, predetermined nodes in the reference map are assigned to the exit area or exit areas of the predetermined region and the predetermined nodes are used to determine whether the mobile object has entered or left the predetermined region by way of an exit area. Instead of or in addition to a pattern-based positioning method, it is also possible to use a positioning method based on triangulation.

The features of the base stations ascertained using the measurements may be configured differently. By preference, the signal strengths and/or the propagation delays and/or the angular distributions at the object of the field emitted by the base stations or at the base stations of the field emitted by the object are used as features. In particular in this situation, a respective measurement is assigned to the first class if the signal strength of at least one base station of a first type exceeds a predetermined value. By the same token, a respective measurement is preferably assigned to the third class if the signal strength of at least one base station of the second type exceeds a predetermined value.

In a further embodiment of the method wherein signal strengths are taken into consideration as features, a respective measurement is assigned to the second class in the situation when at least one of the following conditions is satisfied:

the signal strengths of all the base stations inside the predetermined region lie below a predetermined value;

the signal strengths of predetermined base stations outside the predetermined region lie above a predetermined value.

In a further embodiment of the method, a respective measurement is assigned to the second class in the situation when at least the condition is satisfied that there is no adequate correspondence between the features of the base stations of the respective measurement and the features of at least one node in the reference map. By this means, those measurements which on account of their poor correspondence with the reference map are with a certain probability located outside the predetermined region are suitably identified.

In yet another embodiment of the method, measurements from a plurality of predetermined regions are classified simultaneously. By preference, the predetermined regions in this situation are located in different floors of a building, and exit areas of the predetermined regions are specified, by way of which a mobile object is able to change floors. In this manner, with the aid of a two-dimensional positioning in a plurality of floors a separation of the individual floors is made possible, with the result that reference maps of different floors can be defined simultaneously. As a result of the separation of the floors on the basis of the measurements it is furthermore possible to perform a quasi three-dimensional positioning of the mobile object inside the building.

The method according to various embodiments can for example be carried out offline after the actual movement of the object and the measurements performed during the process. It is however also possible for the method to be carried out while the measurements are being performed, whereby in this case the measurements are suitably buffered at a predetermined time interval in order to hereby enable a corresponding tracking of measurements.

In addition to the method described above for the classification of features, the various embodiments furthermore relate to a method for the feature-based positioning of a mobile object in a predetermined region, for which one or more exit areas are defined, by way of which the mobile object can leave and enter the predetermined region, whereby each measurement is specified by a measuring time and measured features of a plurality of base stations, whereby one feature of a base station characterizes a field emitted by the base station at the object or a field emitted by the object at the base station, whereby the measurements are classified on the basis of the method according to various embodiments described above and exclusively measurements of the first class are taken into consideration with regard to the positioning. In this manner, a correct positioning and if applicable a correct learning of a reference map are made possible in a suitable manner.

In addition to the methods described above, the various embodiments furthermore relate to an apparatus for the computer-aided classification of measurements for the feature-based positioning of a mobile object in a predetermined region, whereby the apparatus is designed in such a manner that any embodiment of the classification method described above can be carried out.

Moreover, the various embodiments relate to an apparatus for the feature-based positioning of a mobile object in a predetermined region, whereby the apparatus is designed in such a manner that the positioning method described above can be carried out using the apparatus.

Furthermore, the various embodiments comprise a computer program product having program code stored on a machine-readable medium for carrying out any embodiment of the method described above when the program runs on a computer.

Figure 1:
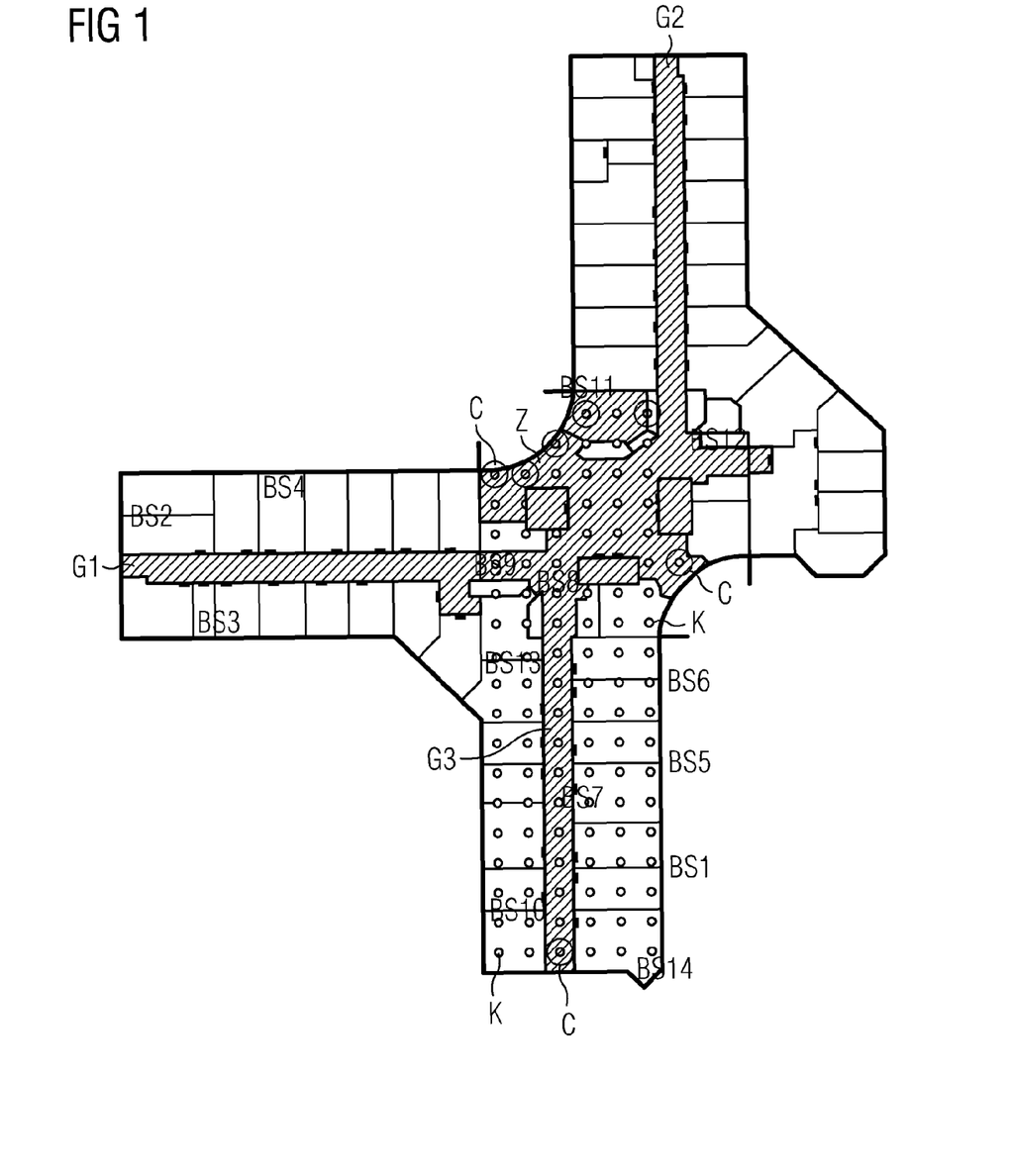
FIG. 1 shows a schematic view from above of the floor plan of the ground floor of a building having a plurality of base stations installed therein, whereby one embodiment of the method has been carried out and tested on the basis of measurements of these base stations.

The method according to various embodiments will be described in the following on the basis of a positioning of a mobile object in a building, whereby the floor plan of the ground floor of this building is shown in FIG. 1. The building comprises three wings, along which extend corridors G1 to G3, which open into a central area Z. The corridors and the central area are highlighted graphically in this situation compared with the remainder of the building. The remainder of the building is essentially formed from a multiplicity of rooms, whereby the rooms are for the most part rectangular and are accessible by way of the corridors.

For the positioning of a mobile object, a multiplicity of WLAN base stations BS1, BS2, . . . , BS14 is installed in the building, whereby a respective base station is situated at that position in the building at which its identifier is depicted in FIG. 1 or at which a line beginning at the identifier ends. In the embodiment described here, a mobile object moves through the building and if applicable also outside the building, whereby the positioning of the object is ascertained by way of the field strength of the individual WLAN fields of the base stations. In this situation, a pattern-based positioning is employed, for which the position of the object is determined on the basis of an initial reference map having a multiplicity of nodes through corresponding comparison of field strength vectors deposited at the nodes with measured field strength vectors.

By preference, a positioning is employed such as is described in the document DE 10 2006 044 293 A1. In this case a calibration of the reference map takes place simultaneously during the positioning, which means that no exact calibration of the reference map needs to be carried out prior to actually performing the positioning. By the same token, it is also possible to employ a probabilistic positioning on the basis of the method described in the German patent application having the number DE 10 2008 038 451.8. This positioning also simultaneously enables the localization of an object and the learning of a reference map. The entire disclosure of the document DE 10 2006 044 293 A1 and the German patent application having the number 10 2008 038 451.8 is made through reference to the content of the present application.

In the example shown in FIG. 1 the reference map is indicated by corresponding nodes in the form of small circles, just a few of which by way of example are denoted by the reference character K. It can be seen that the reference map covers only one part of the building, namely the corridor G3 and the rooms accessible by way of this corridor as well as the central area Z. With regard to conventional positioning methods it should be ensured here that the mobile object is also moving inside the area of the reference map during the positioning since incorrect measurements are otherwise obtained and the reference map is incorrectly learned.

In the following a method is described wherein with regard to the positioning it is no longer necessary to ensure that the object is also actually moving in the area of the reference map. This is done by means of preprocessing the measurements performed for the positioning, which serves to ascertain whether the respective measurement in question is a measurement inside the reference map. Only such measurements are then taken into consideration for the positioning and for learning the reference map. If the purpose of the positioning is primarily intended to be the learning of a suitable reference map, a corresponding person can for example be equipped with a positioning device for the purpose of continuous position measurement, whereby the person does not need to be specifically instructed to move only inside the reference map. Rather, the method according to various embodiments can be used to determine whether a corresponding measurement has taken place in the region of the reference map.

In order to perform the embodiment of the method described in the following the region of the reference map which corresponds to the predetermined region within the meaning of claim 1 is specified by corresponding exit areas, by way of which a mobile object can enter or leave the region of the reference map. In this situation, the specification of these exit areas is effected by a corresponding identification of nodes of the reference map which are located at these exit areas. In FIG. 1, the correspondingly identified nodes are indicated in exit areas by a thick circle around the respective node, whereby by way of example several of these circles are provided with the reference character C. From this it can be seen that the building is accessible at the lower end of corridor G3 and by way of facing accesses in the central area Z. With the aid of the corresponding marked nodes C it is possible to ascertain during positioning whether the mobile object is located in an area by way of which it is possible to enter or leave the region of the reference map.

As described in the following, the measurements at those positions of the object which are not located in the region of the reference map are to be identified during the positioning. These measurements or positions, which are also referred to in the following as OOA measurements or OOA points (OOA=Out of Area), may in this situation be located outside the building or if applicable also inside the building, for example in the corridor G1 in which no reference map is deposited. Furthermore, OOA points may if applicable also be located on other floors of the building. In order to detect OOA points, it is necessary among other things to ascertain whether the mobile object passes through an exit area during the measurements. It is to be noted here that the region of the reference map should be defined such that the number of exit areas is as small as possible and can be recognized as clearly as possible. For example, no single room of the building should be excluded from the reference map, particularly not if as a general rule the mobile object frequently enters and leaves this room.

In the embodiment described here, a coarse localization of the mobile object is performed on the basis of the nodes with the aid of an initial reference map, not yet adequately learned, whereby this map can be based for example on a radial model of the falling signal strengths of the base stations. Instead of a positioning on the basis of a reference map, it is also possible if applicable that a coarse positioning is performed on the basis of triangulation of the signal field strengths of the base stations. The coarse positioning is required in order to determine whether a mobile object enters or leaves an exit area.

The base stations BS1 to BS14 represented in FIG. 1 are assigned to different types depending on their positions, which types are taken into consideration when carrying out the method according to various embodiments.

Four types of base stations are defined here:

Type 1: Base stations inside the region of the reference map, the signal from which is received very strongly only at positions in the region of the reference map.

Type 2: Base stations which are located outside the region of the reference map, such that their signals are only received strongly in positions outside the region of the reference map.

Type 3: Base stations which are located by the exit areas, such that their signal can be received strongly in these exit areas.

Type 4: Base stations which are located at a boundary of the region of the reference map, such that their signals can be received strongly both inside and outside the region of the reference map.

According to FIG. 1 the base stations BS7 and BS8 are base stations of Type 1 because they exhibit relatively large distances to limits of the region of the reference map. The base stations BS2, BS3 and BS4 are of Type 2 because they are located outside the region of the reference map. The base stations BS9 and BS11 are of Type 3 because they are located by exit areas for leaving or entering the region of the reference map. All the remaining base stations are located at the boundary of the region of the reference map and are thus of Type 4.

With regard to the identification of measurements at OOA points, it is desirable that base stations be present in the exit areas in order to determine unambiguously by this means when a mobile object enters or leaves the region of the reference map. Furthermore, base stations of Type 1, which are unambiguously located inside the region of the reference map, are helpful. Base stations of Type 2 which are located outside the region of the reference map may likewise be helpful because this means that positions outside the reference map can be unambiguously specified. It should however be noted in this situation that such base stations are used only for the purpose of the identification of measurements outside the actual reference map. The installation of such base stations is thus often not called for. Nevertheless, in practical applications there can be a multiplicity of such base stations of Type 2, for example in buildings where base stations are distributed over a plurality of floors, whereby the respective region of a reference map is however defined only for one floor. By the same token, base stations of Type 2 can occur with positionings in different neighboring buildings. Base stations of Type 4 are less helpful in the method according to various embodiments for the identification of measurements at OOA points.

Figure 2:
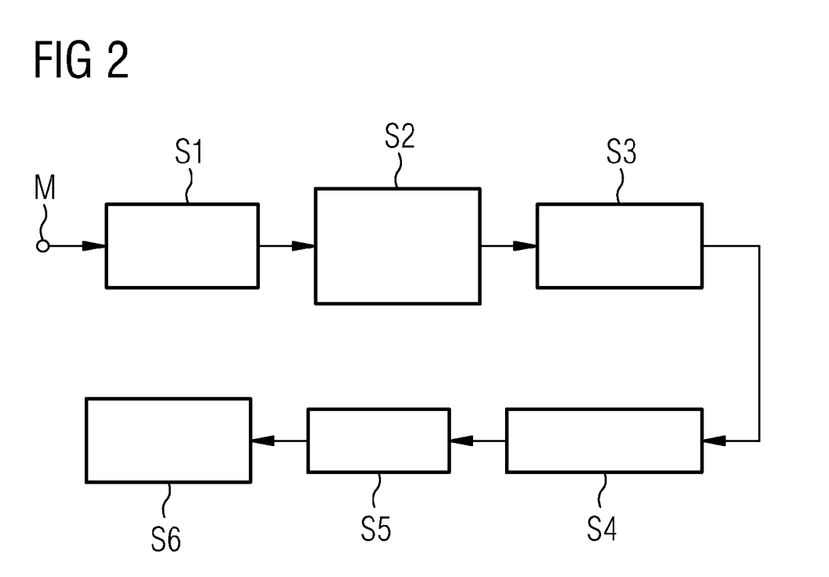
FIG. 2 shows a flowchart which illustrates the steps for one embodiment of the method.

FIG. 2 shows a schematic flowchart of the essential method steps of an embodiment of the method. In this situation, measurements are ascertained at short time intervals while a mobile object is moving, on the basis of which measurements the object can be positioned or the reference map according to FIG. 1 learned. The measurements are indicated here schematically by the reference character M. At the same time the individual measurements are specified in terms of whether they are located inside or outside the region of the reference map. Only measurements inside the region of the reference map are taken into consideration here with regard to the positioning or to the learning of the reference map. The individual measurements performed specify the field strengths of the base stations received at the mobile object in the form of a feature vector and additionally the corresponding measuring time. According to step S1, in this situation the measurements are fed into a corresponding buffer, in which a predetermined number of measurements with their measuring times is always kept while the object is moving. The individual measurements here are received at a rate of at least one measurement within a few seconds, which means that a trackable trail of the mobile object is formed by the buffer.

In a step S2 a classification of the respective measurement is performed in terms of whether the measurement can reliably be assigned to a point inside the region of the reference map or outside the region of the reference map. A classification of a measurement in terms that the location of the measurement is reliably located inside the region of the reference map takes place on the basis of base stations of Type 1 described above. If this yields the result that the received field strength of at least one base station of Type 1 exceeds a predetermined value, the measurement is categorized as a measurement inside the region of the reference map. By the same token, measurements which are reliably located outside the reference map are specified with the aid of base stations of Type 3, whereby a measurement is assigned to a position of the object outside the region of the reference map if the field strength of at least one base station of Type 3 exceeds a predetermined value.

In an embodiment, during the determination of a measuring point located reliably inside the region of the reference map a trail tracking is also carried out over a short distance ("short distance tracking"). In this situation, a movement model of the mobile object is taken into consideration. In other words, a predetermined maximum speed, and thus depending on the position of the object, a maximum period of time are given for the mobile object which the object needs before it leaves the region of the reference map. On the basis of the model, all subsequent measurements are then assigned to the area inside the reference map, provided that they fall within the maximum period of time in accordance with the movement model. Similarly, measurements which follow a measurement reliably located outside the region of the reference map can by using the movement model also be assigned to a position outside the region of the reference map, provided that the following measuring points fall within a time interval in which the mobile object is unable to move into the region of the reference map at its maximum speed.

After the identification in step S2, the remaining measurements can be identified as unclear measurements, from which it is uncertain whether the object is located inside or outside the region of the reference map with regard to the measurement. These unclear measurements are also referred to as potential OOA measurements in the following and identified in step S3. Instead of the identification of the potential OOA measurements as those points which in step S2 cannot be unambiguously assigned to a position inside or outside the reference map, it is also possible that separate criteria are used for the identification of potential OOA measurements. If these criteria are not satisfied and also if no classification is possible as a measurement reliably located inside or outside the reference map, the corresponding measuring point is no longer considered in the remainder of the method. A measurement can for example be categorized as a potential OOA measurement if one or more of the following criteria are satisfied:

The measurement vector of the received field strengths is very weak or is zero for all known base stations inside the region of the reference map;

the measurement value vector of base stations which are located outside the region of the reference map is received very strongly;

the measurement vector cannot be adequately brought into correspondence with the reference map during the positioning by means of the reference map, in other words the deviation of the measurement vector from all the measurement vectors of the nodes is very great.

The last mentioned criterion is helpful in particular in the situation when an initial learning of the reference map has been performed first of all, which means that the initial reference map is already relatively precise.

After the identification of the potential OOA measurements in step S3, a temporal tracking of temporally preceding and temporally previous measuring points takes place in order to further analyze the potential OOA measurements in order to assign these measurements unambiguously to an area inside or outside the region of the reference map. The tracking takes place in this situation in step S4, in which starting from a potential OOA measurement within the set of the buffered measurements tracking proceeds a number of measuring times into the past and a number of measuring times into the future and this continues until a measurement is found which is unambiguously identified as a measurement inside the region of the reference map or outside the region of the reference map.

Starting from this number of measurements it is then possible to ascertain whether the mobile object can enter or leave this region between the potential OOA measurement and the measurement inside or outside the region of the reference map. This can for example happen in such a manner that firstly on the basis of the initial reference map the position of the object with regard to the measurement found, assigned to a position inside or outside the reference map, is positioned and then a movement model serves as the basis for ascertaining whether a crossing of an exit area may occur. In this situation, the movement model in turn takes into consideration the maximum speed of the mobile object, whereby the difference of the measuring times between potential OOA measurement and known measurement, also depending on the known position inside or outside the region of the reference map, serves as the basis for ascertaining whether a crossing of an exit area may occur at all.

If such a crossing is not possible at all on account of the movement model, it is possible to conclude from this that a crossing of this area between the observed measurement and the known measurement inside or outside the region of the reference map has not occurred. If such a crossing is possible on account of the movement model, it is possible on the basis of a coarse positioning using the initial reference map to ascertain whether the mobile object is moving in accordance with the tracked measurements in the area of nodes at exit areas in such a manner that the crossing of the exit area can be deduced.

With regard to the tracking just described of the trail of the mobile object, those trails which end at a measurement inside the region of the reference map are to be preferred because the accuracy of the localization of measurements outside the region of the reference map is very poor. Overall, the following cases can be distinguished with regard to trail tracking:

The trail ends in a measurement which is located inside the region of the reference map. In this case, two sub-cases are in turn to be distinguished:
  i) If the trail does not pass through an exit area on the basis of the analysis described above, the potential OOA measurement must be inside the region of the reference map, even if weak signal strengths have been received for the measurement. The potential OOA measurement is then assigned to a measurement inside the reference map. The signal strengths of the measurement can then be taken into consideration with regard to learning of the reference map.
  ii) If the trail does pass through an exit area, the potential OOA measurement is located outside the region of the reference map and is no longer taken into consideration with regard to further learning of the reference map. If applicable, further measurements along the trail can in this situation also be assigned to the region inside or outside the reference map. In particular, all the measurements up to leaving the exit area can be assigned to the region inside the reference map or all the measurements up to entering the exit area can be assigned to the region outside the reference map and the remaining measurements are assigned to the region outside or inside the reference map.

As a second case, a trail can end both in a forward temporal direction and also in a backward temporal direction at an OOA measurement or potential OOA measurement. The observed measurements along the trail are then probably OOA measurements. Nevertheless, these measurements are not evaluated in such a manner that they are located outside the region of the reference map. Rather, tracking of the trails is continued in the method with further potential OOA points and if applicable another trail tracking can reliably yield the result that a corresponding potential OOA measurement is located inside or outside the reference map. If at the end of the method it has still not been determined with certainty whether a corresponding potential OOA point is located inside or outside the reference map, the point is categorized such that it is located outside the region of the reference map, which means that it is not taken into consideration further with regard to learning of the reference map.

In step S5, all the measurements which have been classified as OOA measurements are then finally discarded with regard to the positioning or learning of the reference map. As is indicated by step S6, it is also possible if applicable when using the method for a plurality of reference maps which for example are located in different floors of the building to be learned simultaneously. In this situation, it is possible by means of suitable specification of exit areas to determine when a mobile object moves from one floor to the next. The change of floor is then determined for example by passage through those exit areas which are located at positions of elevators or staircases. If applicable, different floors can thus also be identified and their reference maps learned by means of the method. In this manner, a quasi 3D-positioning can be achieved on the basis of a 2D-positioning within a floor and the corresponding assignment of the measurements to a respective floor.

By using the method just described it is possible to determine for a multiplicity of measurements either while the measurements are actually being performed or after completion of the measurements which of the measurements can be assigned to the region of the reference map and which of the measurements cannot be assigned to the region of the reference map. This is then taken into consideration with regard to the positioning or the learning of the reference map in such a manner that only those measurements which are located inside the reference map are used for the positional determination of the mobile object and the updating of the reference map. The method can thus be regarded as a preprocessing step for the actual positioning or learning of the reference map.

Figure 3:
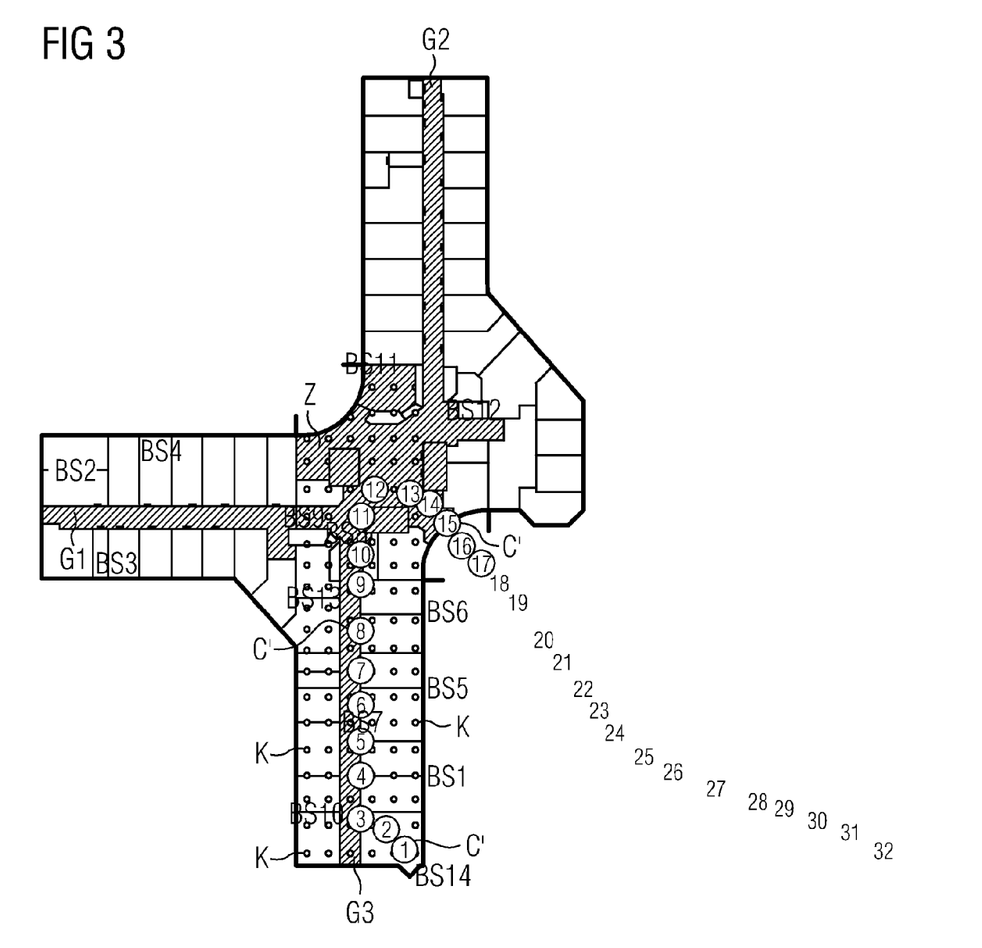
FIG. 3 and FIG. 4 show views of the floor plan of the building by analogy with FIG. 1, in which are illustrated in each case measurements performed along a path of the mobile object and a classification of the measurements based thereon using an embodiment of the method.
Figure 4:
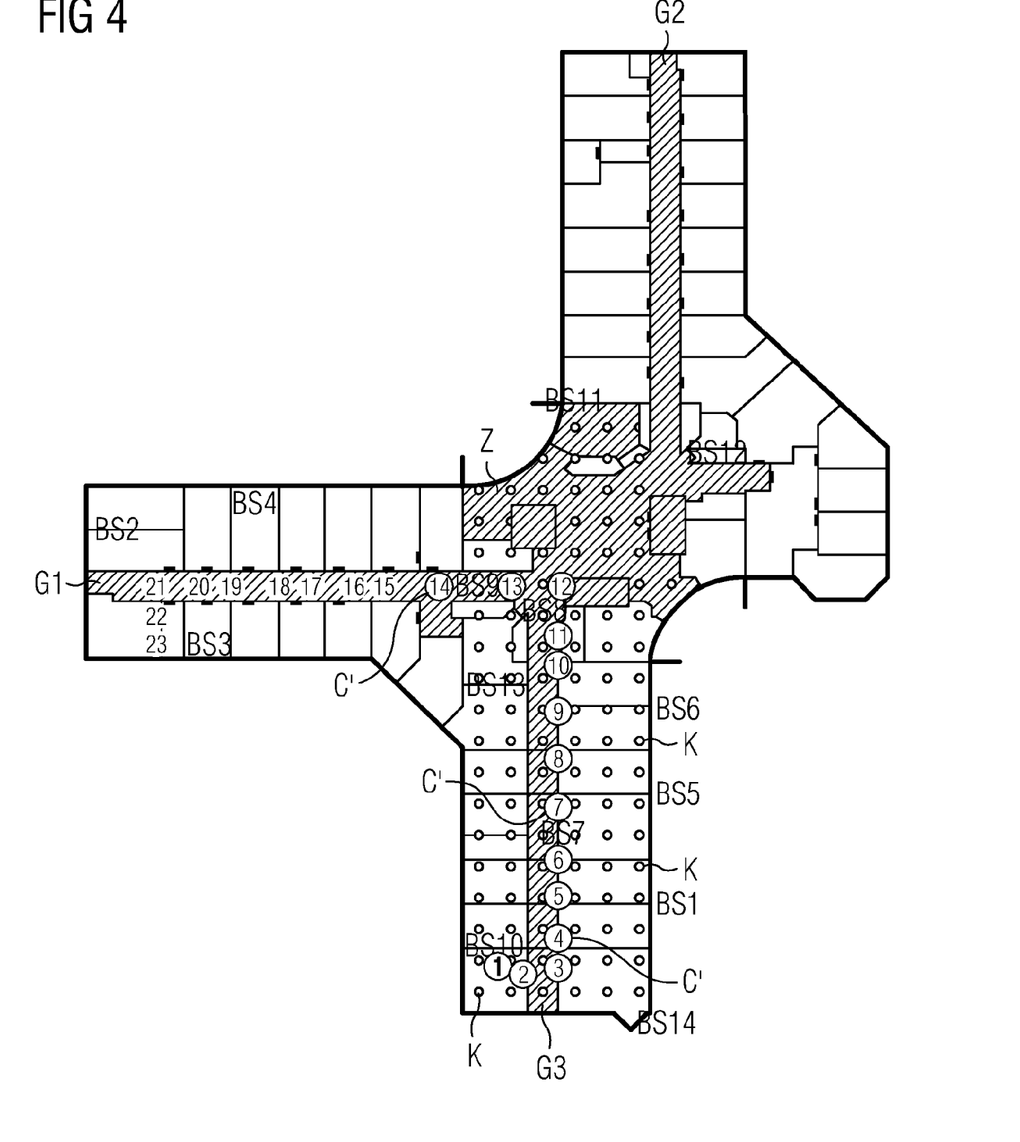

FIG. 3 and FIG. 4 show scenarios according to which an embodiment of the method has been tested on different paths of a mobile object inside and outside the building shown in FIG. 1. In FIG. 3 and FIG. 4 the successive measurement positions of the mobile object are denoted by corresponding numbering. In FIG. 3, measurements are carried out at positions 1 to 32 in this situation. It can be seen that the mobile object moves starting from the position 1 in the vicinity of the base station BS14 along the corridor G3 towards the central area Z, from there leaves the building by way of an exit area and continues moving further away from the building. In this situation the mobile object leaves the building between measurements 15 and 16. Corresponding circles around the numbers of the measurements, which for reasons of clarity are only in part denoted by the reference character C', serve to highlight those measurements inside the region of the reference map by means of the method described above. Corresponding measurements without circles on the other hand are measurements which have been identified as measurements outside the region of the reference map by means of the method described above. It can be seen from FIG. 3 that the method yields very good results. Only the measuring points 16 and 17, which are located outside the region of the reference map, have been incorrectly assigned to the region of the reference map.

FIG. 4 shows a scenario wherein the mobile object moves along a path having 23 measuring points 1 to 23 from a position in the vicinity of the base station BS10 by way of the corridor G3 into the central area Z and thence moves down the corridor G1 until it reaches the base station BS3. In this situation, the region along the corridor G1 is located outside the region of the reference map. Again, corresponding measurements which have been assigned to the region of the reference map by means of the method described above are indicated by corresponding circles C'. All the other measuring points have been assigned to the region outside the reference map. It can be seen that the method again yields very good results. Only the measuring point 14 is incorrectly classified; this has been incorrectly assigned to the region of the reference map although it is located outside this region.

The method according to various embodiments just described for the classification of measuring points can only be employed with regard to the initialization of the positioning or of the corresponding learning method for the reference map. By the same token, the method can be used continuously with regard to learning the reference map. Since the tested method incorrectly classifies at least several points, there is a danger of this error possibly becoming compounded during repeated learning of the reference maps and thus resulting in an incorrectly learned reference map and to an incorrect positioning. The inventors have used a plurality of tests to check whether the use of the method according to various embodiments leads to incorrect results with regard to the initialization of the positioning or with regard to continuous use during the learning of a reference map. It was found that in spite of several incorrectly classified measuring points the method nevertheless converges and even reference maps learned several times correspond very well with the actual reference map which has been defined by means of calibration measurements.

The embodiment described above of the method exhibits a number of advantages. In particular, a localization and if applicable an unsupervised learning of reference maps can be achieved, whereby it is no longer necessary to ensure that the mobile object is also always located in the defined positioning region. Rather, the method itself independently ascertains whether a measurement can be assigned to a positioning region or to a region of a reference map. Only such measurements are then taken into consideration with regard to the positioning or to the learning of the reference map. The learning of a reference map therefore no longer needs to be carried out by a service technician who has the clear instruction to move only inside the reference map. Rather, any users who are moving in the area of the building can also be equipped with a corresponding mobile object, whereby the measurements carried out using this mobile object can after filtering or classification by means of the method according to various embodiments be employed for learning the reference map. Moreover, the method can also be extended in a simple manner to three dimensions by defining corresponding separate reference maps for different floors and determining by way of a suitable definition of exit areas when the mobile object moves from one floor to another.

What is claimed is:

1. A method for the computer-aided classification of measurements for the feature-based positioning of a mobile object in a predetermined region, for which one or more exit areas are defined, by means of which the mobile object can leave and enter the predetermined region, whereby each measurement is specified by a measuring time and measured features of a plurality of base stations, whereby one feature of a base station characterizes a field emitted by the base station at the object or a field emitted by the object at the base station, the method comprising:

classifying the measurements on the basis of the positions of the base stations with respect to the predetermined region and the features of the base stations measured during the respective measurements, whereby:
a respective measurement of a first class is categorized as a measurement in a position of the mobile object inside the predetermined region;
a respective measurement of a second class is categorized as a potential measurement in a position of the mobile object outside the predetermined region; and
a respective measurement of a third class is categorized as a resolved measurement in a position of the mobile object outside the predetermined region;
for a respective measurement of the second class, analyzing a number of successive measurements including the measuring time of the respective measurement up until the occurrence of a measurement of the first class as to whether the mobile object has left or entered the predetermined region by way of an exit area during the course of the number of measurements, whereby in the event that the mobile object has not left or entered the predetermined region the respective measurement is assigned to the first class.

2. The method according to claim 1, wherein in the event that the analysis of the number of successive measurements including the measuring time of the respective measurement up until the occurrence of a measurement of the first class shows that the mobile object has left or entered the predetermined region, at least the respective measurement is assigned to the third class, whereby in particular all the measurements of the number of successive measurements having measuring times prior to entry to or after exit from the predetermined region are assigned to the third class and the remaining measurements of the number of successive measurements are assigned to the first class.

3. The method according to claim 1, wherein a respective measurement is assigned to the first class when the feature of at least one base station of a first type satisfies a predetermined criterion, whereby base stations of the first type are located inside the predetermined region and the predetermined criterion is designed in such a manner that when the criterion is satisfied it is possible to conclude that the mobile object is located inside the predetermined region.

4. The method according to claim 1, wherein a respective measurement is assigned to the second class in the situation when at least one of: the respective measurement cannot be assigned to any other class and when one or more predetermined conditions are satisfied.

5. The method according to claim 1, wherein a respective measurement is assigned to the third class in the situation when the feature of at least one base station of a second type satisfies a predetermined criterion, whereby the base stations of the second type are located outside the predetermined region and the predetermined criterion is designed in such a manner that when the criterion is satisfied it is possible to conclude that the mobile object is located outside the predetermined region.

6. The method according to claim 1, wherein in the case that no measurement of the first class is found for the analysis of the number of successive measurements including the respective measurement, the respective measurement remains in the second class.

7. The method according to claim 1, wherein for a respective measurement of the first class all the measurements within a period of time including the measuring time assigned to the respective measurement are assigned to the first class, whereby the period of time is given by the time interval during which the mobile object, on the basis of its position at the measuring time of the respective measurement and based on a predetermined maximum speed of the mobile object, is unable to move out of the predetermined region.

8. The method according to claim 7, wherein a respective measurement is assigned to the first class when the feature of at least one base station of a first type satisfies a predetermined criterion, whereby base stations of the first type are located inside the predetermined region and the predetermined criterion is designed in such a manner that when the criterion is satisfied it is possible to conclude that the mobile object is located inside the predetermined region, and, wherein for the respective measurement of the first class the position of the mobile object at the measuring time of the respective measurement is estimated as the position of the base station of the first type, the feature of which satisfies the predetermined criterion.

9. The method according to claim 1, wherein for a respective measurement of the third class all the measurements within a period of time before and/or after the measuring time assigned to the respective measurement are assigned to the third class, whereby the period of time is given by the time interval during which the mobile object, on the basis of its position at the measuring time of the respective measurement and based on a predetermined maximum speed of the mobile object, is unable to move into the predetermined region.

10. The method according to claim 9, wherein a respective measurement is assigned to the third class in the situation when the feature of at least one base station of a second type satisfies a predetermined criterion, whereby the base stations of the second type are located outside the predetermined region and the predetermined criterion is designed in such a manner that when the criterion is satisfied it is possible to conclude that the mobile object is located outside the predetermined region, wherein for the respective measurement of the third class the position of the mobile object at the measuring time of the respective measurement is estimated as the position of the base station of the second type, the feature of which satisfies the predetermined criterion.

11. The method as claimed according to claim 1, wherein with regard to the analysis of the number of successive measurements before and/or after the measuring time of the respective measurement the positions of the mobile object are estimated on the basis of the measured features of the base stations at the measuring times of the number of measurements using at least one of a positioning method and a movement model of the mobile object and from this is ascertained whether the mobile object has entered or left the predetermined region by way of an exit area.

12. The method according to claim 11, wherein the positioning method is a pattern-based positioning method, wherein the position of the mobile object is ascertained on the basis of the correspondence of the measured features of the base stations with the features of nodes in a reference map, whereby predetermined nodes in the reference map are assigned to the exit area or exit areas of the predetermined region and the predetermined nodes are used to determine whether the mobile object has entered or left the predetermined region by way of an exit area.

13. The method according to claim 12, wherein the features of the base stations are at least one of: the signal strengths, the propagation delays, and the angular distributions at the object of the field emitted by the base stations or at the base stations of the field emitted by the object, wherein a respective measurement is assigned to the second class in the situation when at least one of: the respective measurement cannot be assigned to any other class and when one or more predetermined conditions are satisfied, wherein a respective measurement is assigned to the second class when at least the condition is satisfied that there is no adequate correspondence between the features of the base stations of the respective measurement and the features of at least one node in the reference map.

14. The method according to claim 11, wherein the positioning method is based on triangulation of the features of the base stations.

15. The method according to claim 1, wherein the features of the base stations are at least one of: the signal strengths, the propagation delays, and the angular distributions at the object of the field emitted by the base stations or at the base stations of the field emitted by the object.

16. The method according to claim 15, wherein a respective measurement is assigned to the first class when the feature of at least one base station of a first type satisfies a predetermined criterion, whereby base stations of the first type are located inside the predetermined region and the predetermined criterion is designed in such a manner that when the criterion is satisfied it is possible to conclude that the mobile object is located inside the predetermined region, wherein a respective measurement is assigned to the first class if the signal strength of at least one base station of a first type exceeds a predetermined value.

17. The method according to claim 15, wherein a respective measurement is assigned to the third class in the situation when the feature of at least one base station of a second type satisfies a predetermined criterion, whereby the base stations of the second type are located outside the predetermined region and the predetermined criterion is designed in such a manner that when the criterion is satisfied it is possible to conclude that the mobile object is located outside the predetermined region, wherein a respective measurement is assigned to the third class if the signal strength of at least one base station of the second type exceeds a predetermined value.

18. The method according to claim 15, wherein a respective measurement is assigned to the second class in the situation when at least one of: the respective measurement cannot be assigned to any other class and when one or more predetermined conditions are satisfied, wherein a respective measurement is assigned to the second class when at least one of the following conditions is satisfied:
the signal strengths of all the base stations inside the predetermined region lie below a predetermined value;
the signal strengths of predetermined base stations outside the predetermined region lie above a predetermined value.

19. The method according to claim 1, wherein measurements from a plurality of predetermined regions can be classified using the method, whereby the predetermined regions are located in different floors of a building and exit areas of the predetermined regions are specified, by way of which a mobile object is able to change floors.

20. The method according to claim 1, wherein the method is carried out after the measurements have been performed.

21. The method according to claim 1, wherein the method is carried out while are measurements are being performed, whereby the measurements are buffered at a predetermined time interval.

22. A computer program product comprising a non-transitory computer readable medium storing program code for carrying out a method as claimed in claim 1 when the program runs on a computer.

23. A method for the feature-based positioning of a mobile object in a predetermined region, for which one or more exit areas are defined, by means of which the mobile object can leave and enter the predetermined region, the method comprising:
specifying each measurement by a measuring time and measured features of a plurality of base stations, whereby one feature of a base station characterizes a field emitted by the base station at the object or a field emitted by the object at the base station, and
classifying the measurements on the basis of the positions of the base stations with respect to the predetermined region and the features of the base stations measured during the respective measurements, whereby:
a respective measurement of a first class is categorized as a measurement in a position of the mobile object inside the predetermined region
a respective measurement of a second class is categorized as a potential measurement in a position of the mobile object outside the predetermined region; and
a respective measurement of a third class is categorized as a resolved measurement in a position of the mobile object outside the predetermined region;
for a respective measurement of the second class, analyzing a number of successive measurements including the measuring time of the respective measurement up until the occurrence of a measurement of the first class as to whether the mobile object has left or entered the predetermined region by way of an exit area during the course of the number of measurements, whereby in the event that the mobile object has not left or entered the predetermined region the respective measurement is assigned to the first class;
wherein exclusively measurements of the first class are taken into consideration with regard to the positioning.

24. A computer program product comprising a non-transitory computer readable medium storing program code for carrying out a method as claimed in claim 23 when the program runs on a computer.

25. An apparatus for the computer-aided classification of measurements for the feature-based positioning of a mobile object in a predetermined region, whereby the apparatus is configured:
to classify the measurements on the basis of the positions of the base stations with respect to the predetermined region and the features of the base stations measured during the respective measurements, whereby:
a respective measurement of a first class is categorized as a measurement in a position of the mobile object inside the predetermined region;
a respective measurement of a second class is categorized as a potential measurement in a position of the mobile object outside the predetermined region; and a respective measurement of a third class is categorized as a resolved measurement in a position of the mobile object outside the predetermined region;

for a respective measurement of the second class, to analyze a number of successive measurements including the measuring time of the respective measurement up until the occurrence of a measurement of the first class as to whether the mobile object has left or entered the predetermined region by way of an exit area during the course of the number of measurements, whereby in the event that the mobile object has not left or entered the predetermined region the respective measurement is assigned to the first class.

26. An apparatus for the feature-based positioning of a mobile object in a predetermined region, whereby the apparatus is configured:

to specify each measurement by a measuring time and measured features of a plurality of base stations, whereby one feature of a base station characterizes a field emitted by the base station at the object or a field emitted by the object at the base station, wherein the apparatus classifies the measurements by:

classifying the measurements on the basis of the positions of the base stations with respect to the predetermined region and the features of the base stations measured during the respective measurements, whereby:

a respective measurement of a first class is categorized as a measurement in a position of the mobile object inside the predetermined region;

a respective measurement of a second class is categorized as a potential measurement in a position of the mobile object outside the predetermined region; and a respective measurement of a third class is categorized as a potential measurement in a position of the mobile object outside the predetermined region;

for a respective measurement of the second class, analyzing a number of successive measurements including the measuring time of the respective measurement up until the occurrence of a measurement of the first class as to whether the mobile object has left or entered the predetermined region by way of an exit area during the course of the number of measurements, whereby in the event that the mobile object has not left or entered the predetermined region the respective measurement is assigned to the first class;

wherein exclusively measurements of the first class are taken into consideration with regard to the positioning.

27. A method for the computer-aided classification of measurements for the feature-based positioning of a mobile object in a predetermined region defined by a reference map, for which one or more exit areas are defined, by means of which the mobile object can leave and enter the predetermined region, whereby each measurement is specified by a measuring time and measured features of a plurality of base stations, whereby one feature of the reference map characterizes a field emitted by the plurality of base stations at the mobile object or a field emitted by the mobile object at the plurality of base stations, the method comprising:

taking a plurality of measurements characteristic of the fields emitted;

classifying each measurement of the plurality of measurements on the basis of the positions of the base stations with respect to the reference map during the respective measurement, whereby a respective measurement of a first class is categorized as a measurement in a position of the mobile object inside the predetermined region and a respective measurement of a second class is categorized as a measurement in a position of the mobile object potentially outside the predetermined region;

analyzing a number of successive measurements including the respective measurement of the second class up until the occurrence of a measurement of the first class as to whether the mobile object has left or entered the predetermined region by way of an exit area during the course of the number of successive measurements, whereby in the event that the mobile object has not left or entered the predetermined region the respective measurement is assigned to the first class;

wherein the position of the mobile object is ascertained on the basis of the correspondence of the measured features of the base stations with the features of nodes in the reference map, whereby predetermined nodes in the reference map are assigned to the exit area or exit areas of the predetermined region and the predetermined nodes are used to determine whether the mobile object has entered or left the predetermined region by way of an exit area.

* * * * *